United States Patent [19]
Chertok

[11] 3,740,733

[45] June 19, 1973

[54] STORING DIGITAL DATA ON A GROOVED RECORD MEDIUM

[75] Inventor: Allan Chertok, Cambridge, Mass.

[73] Assignee: EG & G, Inc., Bedford, Mass.

[22] Filed: Nov. 1, 1971

[21] Appl. No.: 194,262

Related U.S. Application Data

[62] Division of Ser. No. 788,441, Jan. 2, 1969.

[52] U.S. Cl...... 340/173 R, 235/150.5, 340/347 DA

[51] Int. Cl........ G11b 3/00, G06j 3/00, G08c 13/00

[58] Field of Search................................ 235/150.5; 340/172.5, 347 DA, 173 R

[56] References Cited

UNITED STATES PATENTS

| | | | |
|---|---|---|---|
| 3,388,330 | 6/1968 | Kretzmer | 325/42 |
| 3,506,811 | 4/1970 | Yetter | 235/150.5 X |
| 3,403,225 | 9/1968 | Mislan | 340/172.5 X |
| 3,508,153 | 4/1970 | Gerrish | 333/18 X |
| 3,303,335 | 2/1967 | Pryor | 235/181 |
| 3,524,169 | 8/1970 | McAuliffe | 333/18 X |
| 3,508,002 | 4/1970 | Hauer | 340/172.5 X |

*Primary Examiner*—Bernard Konick
*Assistant Examiner*—Stuart Hecker
*Attorney*—Ralph L. Cadwallader

[57] ABSTRACT

Apparatus for storing digital data on a grooved record medium including circuit means for converting a series of digital signals of the form $a_1, a_2, \ldots a_n$ to control signals of the form $b_1, b_2, \ldots b_n$ wherein $b_n = [a_n + b_{n-2}]$-mod 2, a staircase type symbol generator for converting the control signals into a series of superposed signals, each having substantially the form in the time domain $$S(t) = 1/2 \left[ \frac{\sin \pi(T+t)}{\pi(T-t)} - \frac{\sin \pi(T-t)}{\pi(T-t)} \right]$$

wherein $t$ = the instantaneous time
and $T$ = the interval between the superposed symbols, a record cutter head and means for driving the record cutter head to inscribe the waveform on a record medium.

5 Claims, 16 Drawing Figures

STORING DIGITAL DATA ON A GROOVED RECORD MEDIUM

This is a division of U. S. Pat. Application Ser. No. 788,441 filed Jan. 2, 1969.

FIELD OF THE INVENTION

This invention relates in general to the storage of digital data and more particularly to a method and means for storing digital data at relatively high densities in a grooved recording medium such as a phonograph disk.

BACKGROUND OF THE INVENTION

In the storage of digital data in a storage medium to be read out at a subsequent time, the parameters governing the design of the system will vary considerably depending upon the specifics of the use for the particular system. In virtually all storage systems, however, it is desirable to obtain the maximum storage capacity consistent with the other system requirements. These requirements may relate to economic or environmental conditions which might narrow the choice of the recording medium and limit the complexity and precision of the recording or readout equipment, and to numerous other conditions as well. For example, the data capacity of the medium depends directly upon the number of signal levels which can be accurately recorded and read out. If the tolerances of the system are such that four discrete signal levels can be reliably resolved, the capacity is substantially increased over a system in which only two levels may be recognized, but the system complexity and the tolerance requirements for a multiple signal level system are quite severe.

Specific storage media themselves have inherent characteristics which affect their storage capacity and suitability for particular applications. In applications where replication of a recording containing specific stored data is important, magnetic tapes and disks have a relatively high cost factor. One medium which can readily be replicated is a phonograph disk. Using conventional techniques phonograph disks require complex systems to obtain a reasonably high storage density. This limitation on storage capacity is attributable in part the fact that the signal from the readout cartridge of a phonograph is proportional to the velocity of the stylus in the plane normal to the groove direction. This groove velocity for a sinusoidally varying groove may be expressed as, $$V_g = 2\pi f D \cos 2\pi f t$$

where $f$ = the temporal-frequency of the groove variations and $t$ = the instantaneous time and $D$ = the peak stylus displacement in the plane normal to its direction. The peak stylus velocity may be expressed as $$V_G = 2\pi f D$$

and, if $D$ is in microns and $f$ is in kilohertz, then $$V_G = 0.2\pi f D \text{ cm/sec.}$$

Typically, $V_G$ will equal 5 cm/sec. If $f$ is 1 KHz $D$ is then equal to 8 microns. In vinyl records a surface finish of a few microinches is usual, and hence an 8 micron displacement (320 microinches) provides a large signal to noise ratio. From the above equations, it is apparent that the displacement must increase with decreasing frequency to maintain a given stylus velocity. Therefore signals containing very low frequency components and/or a DC component, cannot be directly recorded and reproduced.

In order then to record digital data on such a record, the baseband data signal must either be free of low frequency components, or must be translated by a modulation process. While a relatively high density of storage may be obtained using efficient modulation techniques such as vestigial side band AM, a demodulation apparatus is required in the readout system which may be an unacceptable complication for a number of practical applications. On the other hand, conventional base band data formats which do not have a DC component exhibit wide band frequency characteristics which do not favorably compare with the maximum spectral efficiency of two bits per cycle of bandwidth, established by Nyquist for a two level system.

Other factors influencing the storage capacity of a grooved record medium, involve the types of noise and signal distortions which corrupt the reproduced data signal and effect the probability of error in determining the logical value of each data bit. In a grooved record medium, one source of signal distortion arises from the effect which is known as tracing error. This effect arises from the distortion in wave form produced by a stylus of finite radial dimensions following an undulating groove, when the width of the groove in an inflection becomes comparable with the stylus dimension. For a slowly undulating groove where the radius of curvature at groove inflections is substantially greater than that of the stylus, the electrical wave form produced as a result of the stylus tracing the groove will be a substantially faithful reproduction of the groove shape. However, when the amplitude and frequency of the groove are such that the inflections have a radius of curvature comparable to that of the stylus, the electrical wave form produced becomes distorted. This distortion results in a reduced logical 1 to logical 0 discrimination distance in the reproduced data signal and hence increases the probability of decision error due to noise, timing jitter, and discriminator level uncertainty. To minimize tracing distortion it is therefore desirable to have a baseband data signal of the smallest possible bandwidth so as to limit the minimum radius of curvature of the undulating groove.

BRIEF SUMMARY OF THE INVENTION

Broadly speaking, in the present invention, the digital data to be stored on the record medium is converted into a series of superposed band limited wave forms (symbols) and this series of superposed symbols together with a clocking signal is then stored on the record medium. Each symbol has the form in the time domain $$S(t) = 1/2 \left[ \frac{\sin \pi(T+t)}{\pi(T+t)} - \frac{\sin \pi(T-t)}{\pi(T-t)} \right]$$

where $t$ is the instantaneous time, and $T$ is the signaling interval. This symbol, which has been described in a paper entitled, A New Signal Format For Efficient Data Transmission by P.K. Becker et al, Page 240 Nerem Record 1966, has no DC component and when combined in a series of identical symbols separated by intervals $T$ has an amplitude at each interval which is either 0 or plus or minus 1. In the frequency domain this symbol (and a random superposition of such symbols) has a pseudo low pass characteristic described by $$S(f) = \text{Sin}\ (2\pi f/F_D)\ \text{for}\ 0 \leq f \leq F_D/2$$

where $F_D$ is the data rate equal to $1/T$. It should be noted that the upper limit of the frequency spectrum is one half the data rate and hence the Nyquist maximum of two bits per cycle is achieved. In the invention this symbol is directly recorded without utilizing any carrier, thereby entirely eliminating the necessity for any demodulation and the complex equipment required for it. A synchronizing clock sinusoid at a frequency equal to the data rate may be superimposed upon the series of symbol signals and yet readily separated at the readout apparatus by a simple filter since the clock frequency will be twice that of the maximum frequency of the data signals.

Using this symbol the readout may be accomplished by filtering out the clock sinusoid and, using it as a synchronizing signal, determining whether the data signal falls within or outside of a pair of voltage discrimination levels. Generally the series of superposed signals may be regarded as having, at each clock time, the value of zero or of plus one or minus one. A value of zero corresponds to a zero in the original bit train of data and either a plus one or a minus one can correspond to a one in the original bit train. The discriminator may be made a single polarity discriminator by full wave rectifying the data signal so that both plus and minus signals appear as one polarity.

The invention also includes an apparatus for generating the series of symbols in response to a train of digital data. The apparatus may be operated at any one of a selected number of desired data rates.

DESCRIPTION OF PREFERRED EMBODIMENTS

Figure 1A:
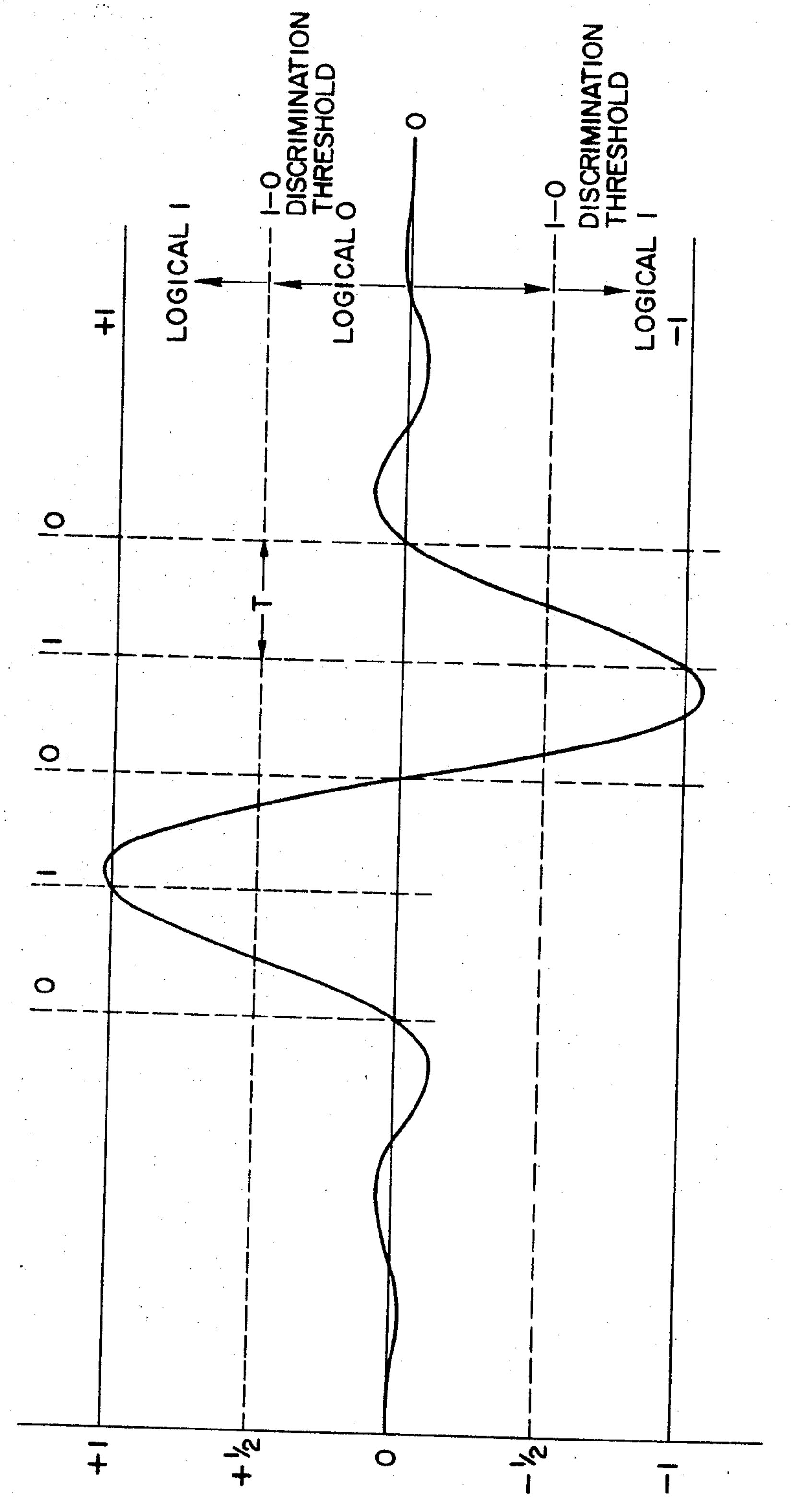
FIGS. 1*a* and 1*b* are illustrations in graphical form of the characteristics of the baseband symbol wave form which is used in the practice of this invention.
Figure 1B:
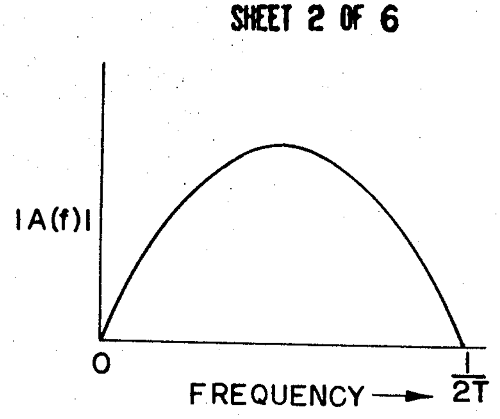

As above mentioned, the method of this invention employs a series of superposed symbols to represent a digital data train. In FIG. 1*a* there is illustrated in the time domain the baseband symbol which is used in the method of the invention. The frequency spectrum of the symbol of FIG. 1*a* is illustrated in FIG. 1*b*. The characteristics of this signal which enable it to be used as baseband signal for efficient storage of data on grooved record mediums are attributable to both the time wave form characteristics and the frequency spectrum characteristics.

In the time domain, the symbol is such that it has zero crossings at intervals of $2T$, and has a value of $\pm 1$ midway between zero crossings. Thus the superposition of a series of these symbols can be arranged to produce at each interval, $T$, either a 0 or a $\pm 1$ output. The decoding of the series of superposed symbols can be done with a simple two level slicer providing an output indicating whether the wave form has a 0 level or a $\pm 1$ level.

In the frequency domain, the spectrum extends from 0 to a frequency, $1/2T$ with a generally symmetrical shape. Thus for a data rate which typically might be 16,000 bits per second the bandwidth required is 8 kilohertz providing 2 bits per cycle of bandwidth. The symbol has no DC component and hence is suitable for recording on a medium requiring a pseudo low pass characteristic. Additionally, the slope of the low end of the frequency spectrum is about 6 db per octave. This spectrum then has little low frequency content as well as having the minimum possible overall bandwidth.

These spectral characteristics are highly compatible with the requirements of recording digital data on a grooved record medium. In recording on a grooved record medium, it is usual to record with a constant velocity characteristic, wherein the cutting stylus radial velocity is made to be proportional to the signal amplitude only, and is independent of signal frequency. From consideration of the equations described earlier, it is apparent then that with decreasing frequency the displacement must be increased. Because of this characteristic, a concentration of the data information in the low frequency range would result in an increase in the average displacement required and hence a decrease in the spatial density of the stored digital information.

In the voice recording industry the constant velocity recording characteristic is modified according to standards established by the Record Industry Association of America which modifies the low frequency end of the spectrum to be recorded so as to provide a 6 dB/octave rolloff of the low end. This is done to limit the radial groove excursion at low frequencies and provide a better balance between excursions for both low and high frequencies. The correct frequency spectrum for the recording is reconstituted on playback by introducing a complementary circuit between the pickup head and the audio system.

In the case of the symbol selected for digital data recording the frequency spectrum inherently has a 6 db per octave fall off below mid-band frequency.

As previously mentioned, in recording on a grooved record medium a source of distortion of the recorded wave forms occurs at the high frequency end of the spectrum. This distortion has been designated tracing distortion and arises from the fact that the reproducing stylus has a finite size. When the inflections of the groove undulation become compatible in size with the radius of the reproducing stylus, the center of the stylus no longer faithfully reproduces the wave form of the groove, since it cannot accurately reproduce the curvature of these inflections. The radius of curvature of the inflections will depend upon the frequency and amplitude of the signal being recorded, as well as the speed of rotation of the disk at the time the recording is being made. The radius of the inflections in the wave form decreases with increasing frequency, increasing amplitude and decreasing the recording turntable speed. However, increasing the recording turntable speed results in a decreased storage density since the same signal in the time domain occupies a greater amount of space on the recording medium. Again decreasing the signal amplitude increases the probability of errors due to a decreased signal to noise ratio. In recording digital data this tracking distortion results in a time distortion in the wave forms, producing uncertainty in defining signal levels at the synchronized detection points. It is accordingly desirable to have a frequency spectrum of the recorded signals which does not include a preponderance of high frequencies. Again the frequency spectrum for the symbol employed in this invention decreases to 0 at the maximum frequency, $F_D/2$, with the heaviest concentration of frequencies being about the mid-band frequency.

Figure 2:
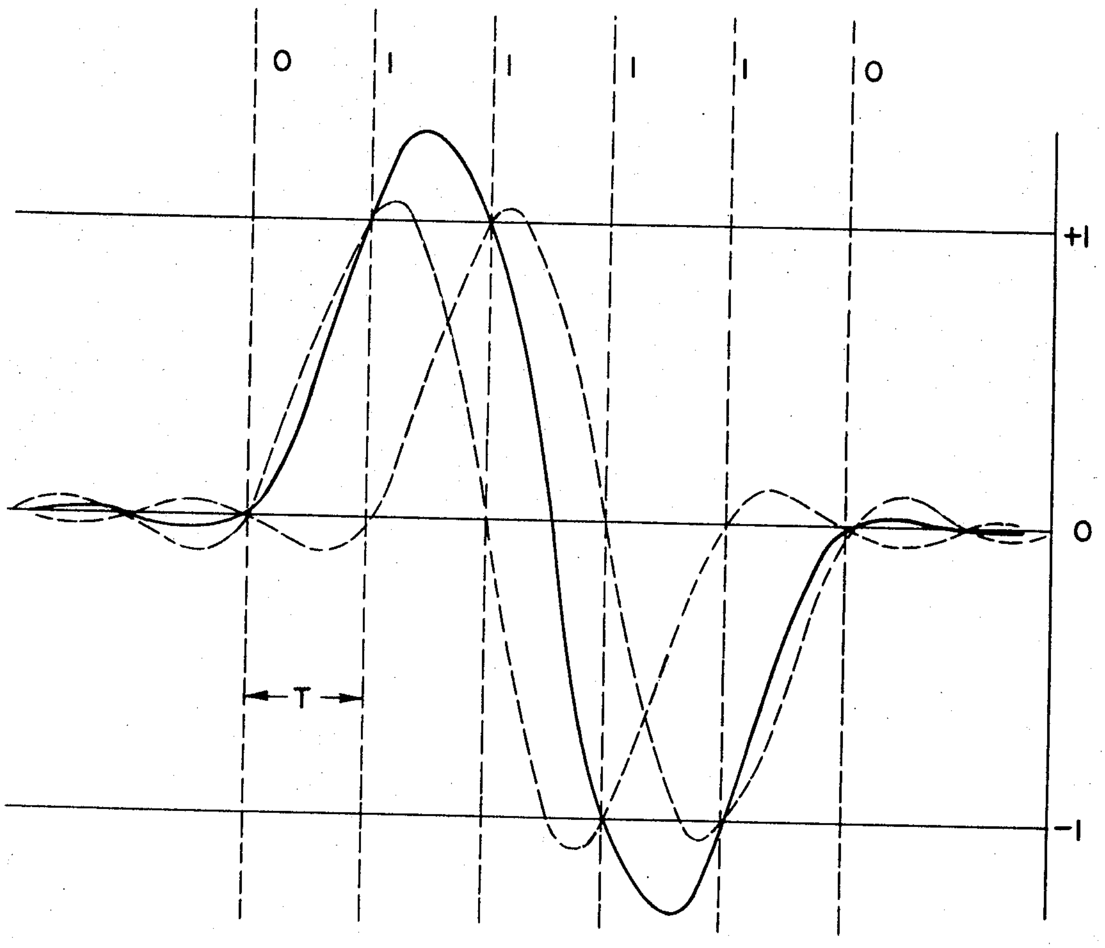
FIG. 2 is an illustration in graphical form of a series of superposed symbols.

The manner in which symbols may be superposed at the recording station to generate the desired sequence of digital data at the reproduction station is illustrated in FIGS. 1*a* and 2. A single symbol, as illustrated in FIG. 1*a*, when detected with a set of amplitude discriminators which recognize the signal as either being a logical 0 level or a logical 1 level, represents a digital data series of 01010. If a second symbol is combined with the first, but spaced an interval T later, then the resultant wave form appears as illustrated in the solid line of FIG. 2. In FIG. 2 the dotted lines represent the individual symbols which were superposed to make up the solid line wave form. The two superposed symbols then represent a series of digital data 011110. If a third symbol was immediately superposed on the wave form illustrated in FIG. 2, but spaced one interval T after the second symbol, the resultant wave form would represent an original digital data series, 011011.

In order then to reproduce a series of digital data signals by a series of recorded superposed symbols of this form, the original data series must be converted into a second series indicating whether or not, at each interval $T$, a new symbol is to be superposed. If the original data sequence is represented as $a_1, a_2 \ldots a_n$ then the series for controlling the generation of data symbols may be represented as, $b_n = [a_n + b_{n-2}] \bmod 2$. In order to reconstitute the original digital data stream from the series of symbols stored on the record, the readout from the record may be detected with a set of level slicers discriminating between signals greater than +½ or less than −½ (logical 1's) and signals less than +½ or greater than −½ (logical 0's) which slicers are interrogated at intervals $T$, for a precisely located instant. By full wave rectifying the output wave forms, the slicer need only distinguish between signals >+½ (logical 1's) and signals <+½ (logical 0's).

Figure 3:
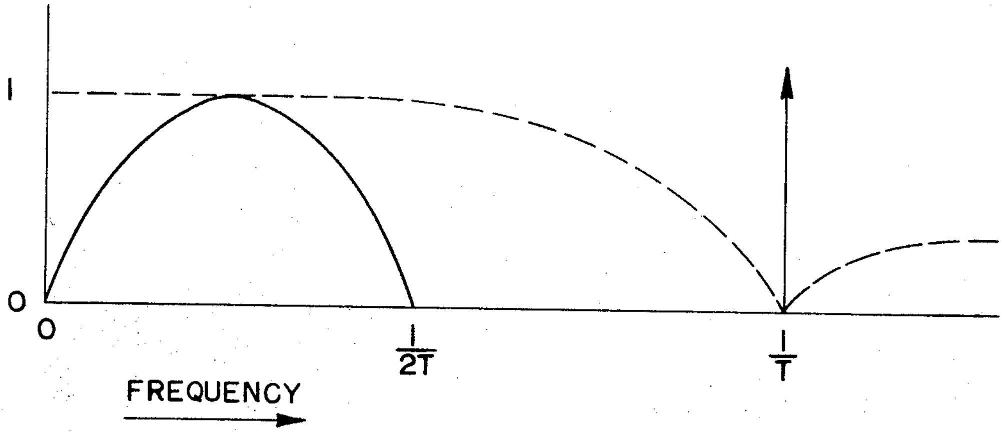
FIG. 3 is an illustration in graphical form of the frequency spectrum of a combined data symbol and clock signal used in the practice of the invention.

Some means of synchronizing this readout decoding system, is then required. With close control of the recording and readout velocity, logic systems may be employed to derive a synchronizing signal from the data signal, however a simpler method is to superpose a clock sinusoid on the same track. Since, as noted earlier, the frequency spectrum of the data signal extends only to a frequency $F_D/2$, then a clock sinusoid recorded at a frequency $F_D$, that is the data rate, is widely separated in frequency from the maximum frequency of the data signals. Thus a simple filter may be used to segregate this clock signal from the data signal. The clock sinusoid zero crossings may then be employed to time the interrogation of the data level slicer. This situation is illustrated in FIG. 3 in which the data signal spectrum is shown as extending from 0 to a frequency $1/2T$ and a clock signal is shown as occurring at $1/T$. The dotted line indicates an appropriate filter characteristic which would be used to segregate the clock signal from the data signal.

Alternatively, a stereo recording apparatus may be used wherein two signals are cut in the same groove, with the data signal in one channel and the clock sinusoid in the other. This technique eliminates the need for data and clock separation filters as such separation is provided by the orthogonality of the two groove wall modulations. Note too, that if channel separation were adequate, one might choose to record separate data and clock signals in each of the two stereo channels, and thereby double the capacity of the disk.

FIGS. 4*a* through 4*e* illustrate the development of a so called "EYE" pattern which results from observation of a random superposition of symbols on an oscilloscope synchronized by the clock. At precisely $t_i$ the data signal has either a 0 value or a ± 1 value. The eye opening in the pattern has horizontal as well as vertical breadth, so that at times slightly removed from $t_i$, the amplitude signals may still be categorized as either 0 or ±1, depending upon the amplitude level which will be acceptable as defining a ± 1. If the amplitude slicers are set at the widest point of the eye opening, as indicated by the levels designated, slicer level for + ½ and for − ½, then the data interrogation instant $t_i$ when the logical 1 − 0 decision is made, can tolerate an error of up to approximately $\pm T/6$. In particular, a $\pm T/18$ timing error represents approximately a 3dB (30%) reduction in distance between the discrimination threshold and the data signal for logical 1. Additionally, if the time $t_i$ is maintained closely the system can tolerate some distortion in the wave form, which distortion would tend to close the eye opening both vertically and horizontally. In general then, the non zero horizontal and vertical dimensions of the eye pattern achievable with the superposition of these symbols is indicative of the fact that this method of storing the data provides for some variation in apparatus specifications, without introducing error into the stored data train.

Figure 5:
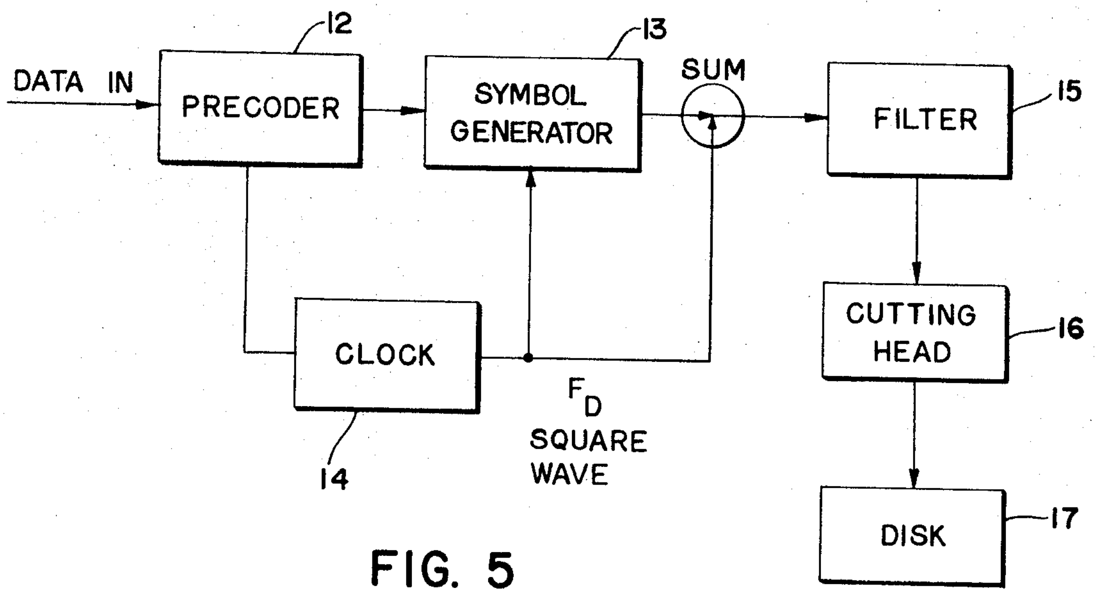
FIG. 5 is an illustration in block diagrammatic form of an apparatus for recording digital data on a grooved record medium in accordance with the principles of this invention.
Figure 4A:
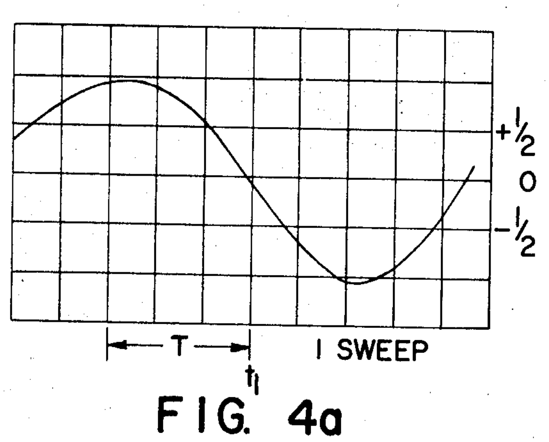
FIGS. 4*a* through 4*e* are illustrations of a graphical representation of superposed oscilloscope wave forms helpful to an understanding of this invention.
Figure 4B:
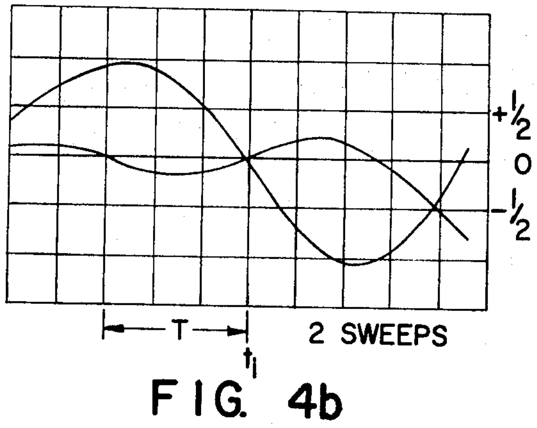
Figure 4C:
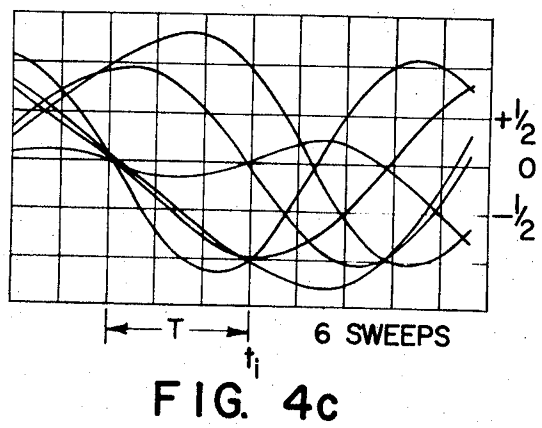
Figure 4D:
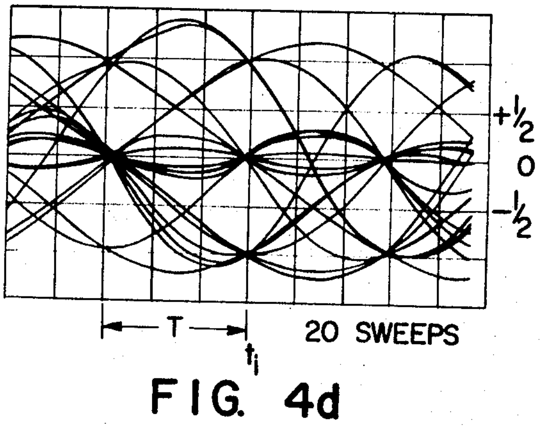
Figure 4E:
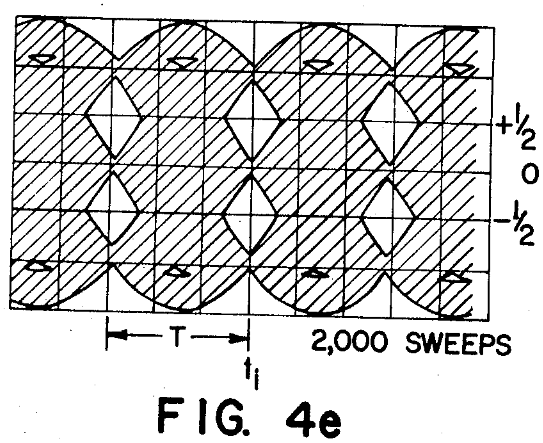

In FIG. 5 there is illustrated in block diagrammatic form, an apparatus for implementing the method of this invention. The apparatus includes a precoder 12, which receives as its input the train of original digital data and provides a series of control signals, in the form of a second train of digital data, to a symbol generator 13. The clock 14 provides synchronizing pulses to both the precoder 12 and the symbol generator 13. The symbol generator 13 performs the function of generating an analog output signal of precisely the symbol wave form in response to logical ones in the reconstituted data series produced by the precoder 12. The series of analog symbols from the symbol generator 13 are combined with a binary clock signal at frequency $F_D$. The composite data and clock signal is band limited by low pass filter 15 and is used to control a cutting head 16 for inscribing the data as an undulating groove on a disk. The mechanism which includes the cutting head 16 and the disk 17 may be the conventional disk cutting mechanism employed in the phonograph recording industry. As discussed earlier in this specification, it is, of course, unnecessary to use the frequency compensation systems employed for voice or music recording to record the data in the form of this series of superposed symbols. In fact, it is found that imposing such compensation degrades the vertical eye opening and hence such compensation is removed from the recording chain and the reproduction system.

The precoder 12 and the symbol generator 13 may be formed in a variety of ways. The logical requirements of the precoder are set forth in the equations relating the series of instruction signals $b_1, b_2 \ldots b_n$ to the original data train, $a_1, a_2 \ldots a_n$ and the implementation of this logic is a matter of design convenience and the particular form of the symbol generator.

The conventional way to generate the signal symbol, illustrated in FIG. 1*a*, would be to use a complex and precise linear filter network which would convert an applied impulse into a wave of the form shown. A second approach is to use an apparatus which generates a staircase approximation to this wave form. A symbol generator of this latter type is described in detail below in connection with FIGS. 7*a* and 7*b*.

Figures 6, 8:
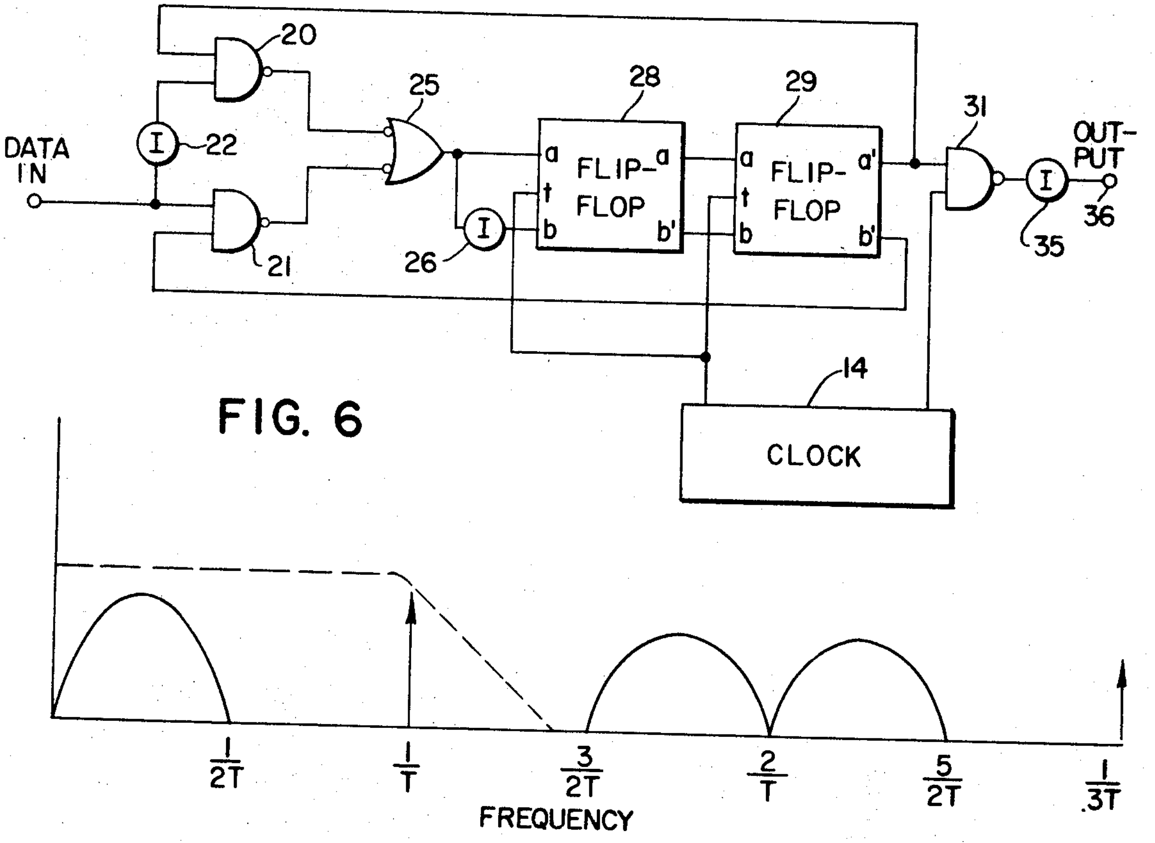
FIG. 6 is an illustration in block diagrammatic form of a precoder system suitable for translating a train of digital data into a series of instructions for generating symbols in accordance with the method of this invention.
FIG. 8 is an illustration in graphical form of the frequency spectrum of signals produced by the symbol generator of FIG. 7*a;*

The unit for performing the function of the precoder 12 is illustrated in FIG. 6. The data into this precoder, in the form of a binary series, $a_1, a_2 \ldots a_n$ is converted into a digital output train for controlling the symbol generator, with the digital output train in the form $b_1$, $b_{2\ 2} \ldots b_n$. The data input is applied directly to one input leg of a NAND gate 21 and also through inverter 22 to one input leg of a second NAND gate 20. The outputs from NAND gates 20 and 21 are both coupled as inputs through NAND gate 25. NAND gate 25 has the inversion at its inputs rather than at its output. The output from gate 25 is connected directly to the a input of flip-flop 28 and through an inverter 26 to the *b* input of the same flip-flop. A second flip-flop 29 has its a input connected to the *a*'output of flip-flop 28 and its *b* input connected to the *b*'output of flip-flop 28. Both flip-flops 28 and 29 are supplied with a triggering input from clock 14. The *a*'output of flip-flop 29 is connected back as the second input leg through NAND gate 20 and the *b*'output from flip-flop 29 is connected back as the second input leg to NAND gate 21. The *a*'output from flip-flop 29 is also connected as one input to another NAND gate 31 which is provided with signals from the clock 14 for its second input. The output from NAND gate 31 is connected through an inverter 35 to the output terminal 36 of the decoder.

The operation of this circuit then depends upon both the value of a digit provided at the data input and the state of the second flip-flop 29. If the *a*' outputs from flip-flops 28 and 29 are regarded as a ones output and the *b*' outputs are regarded as a zeros output, then it can be shown that, for each bit of input data, the output signal will be that expressed by the formula, $$b_n = [a_n + b_{2-2}]\text{mod } 2$$

Figures 7A, 7B:
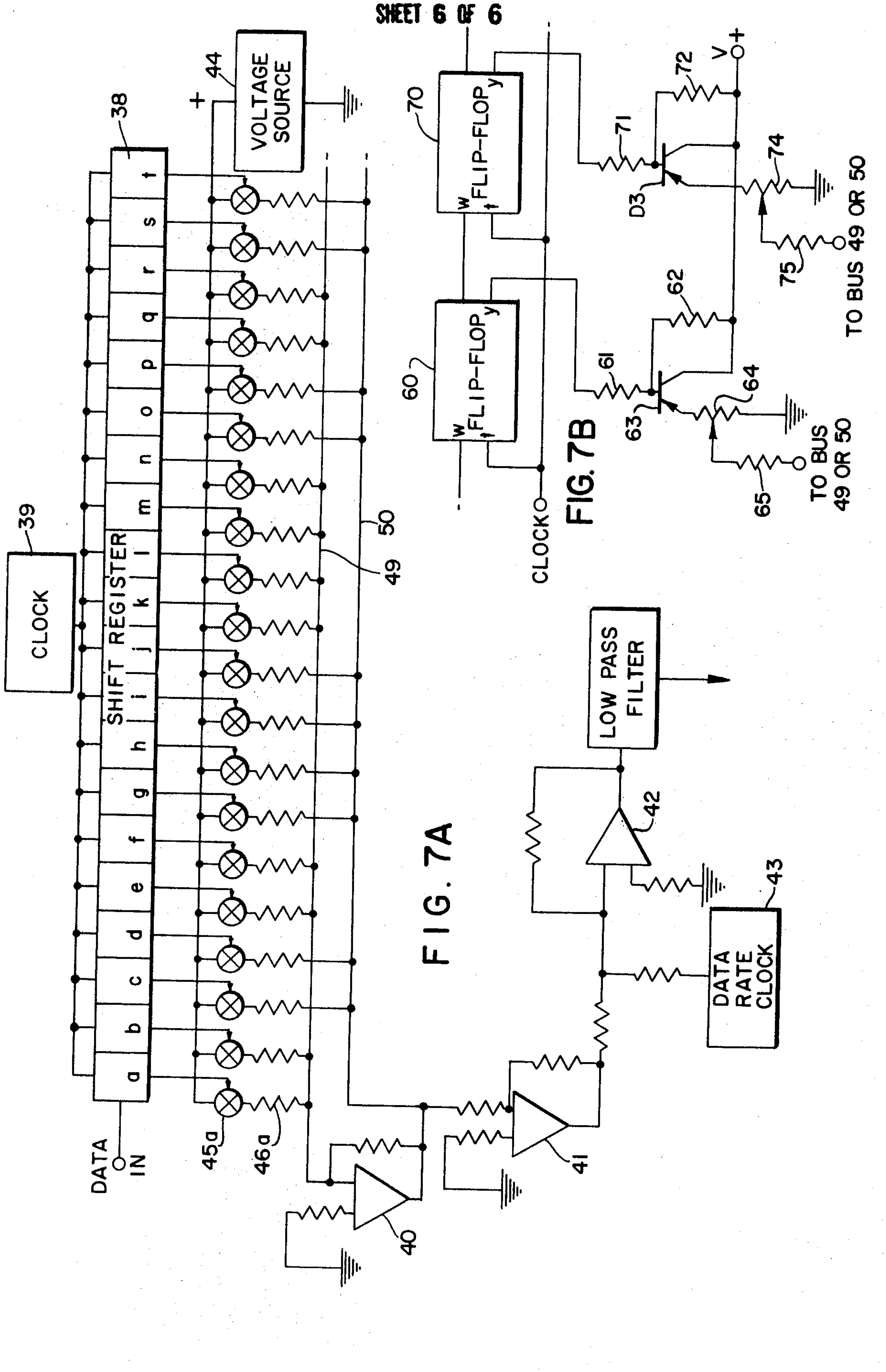
FIG. 7*a* is an illustration in block diagrammatic form of a symbol generator constructed in accordance with the principles of this invention.
FIG. 7*b* is a detailed block diagram of a portion of FIG. 7*a;*

FIGS. 7*a* and 7*b* illustrate a specific embodiment of a symbol generator producing a staircase approximation to the wave form illustrated in FIG. 1*a*. In FIG. 7*a* the overall arrangement of the symbol generator is illustrated and in FIG. 7*b*, a detailed diagram of the units which are reiterated to form the overall apparatus is shown. In general, the symbol generator consists of a shift register 38 which is clocked by a clock 39 providing output pulses at twice the data rate, that is at $2F_D$. Each of the stages of the shift register are connected as a control signal to a corresponding one of a series of switches 45. Each of the switches 45 are connected to a voltage source 44 so that, when actuated, current is passed from the voltage source 44 through a connected one of a series of resistors 46. Some of the series of resistors 46 are connected to a bus 49 and the remainder are connected to a bus 50. The bus 49 is connected as the input to amplifier 40 and the bus 50 is connected together with the output from the amplifier 40 and the bus 50 is connected together with the output from the amplifier 40 as the input to an amplifier 41. The output from amplifier 41 is connected together with a signal from a second clock, designated data rate clock 43 to output amplifier 42. The input data from the precoder is applied as an input to the first stage of the shift register.

The operation of this generator is to provide the staircase approximation of the signal symbol only when a one is present on the data terminal. Thus, if a one is present on the input data terminal, on the first clock pulse this one will be entered into section a of the shift register thus actuating the corresponding switch $45_a$ and passing current through resistor $46_a$ to bus 49. Each successive clock pulse will shift this one through the sequence of sections *b*, *c*, *d*, etc. of the shift register, sequentially actuating each of the corresponding switches and providing current through each of the connected resistors. The amplifiers 40 and 41, then sum the total currents present at any one time and provide this to the output amplifier 42. Since the sample rate for the generator is twice the data rate a complete wave form, as shown in FIG. 1*a*, which includes ten intervals T, requires twice that many, or twenty stages. The values of each of the series of resistors 46 are selected to be inverse to the size of the signal required to generate the staircase approximation to the symbol at the respective point in the wave form. Since the clock rate from clock 39 is twice the data rate, the data input signal can change only for every other shift clock pulse. The duration of a logical 1 input, however, is restricted to ½ a data clock interval, i.e., $T/2$ so that each input 1 results in the propagation of only one bit down the register. Since the symbol utilized has both positive and negative values, then the summing resistors must be capable of providing a weighted signal of both polarities. This is the purpose of the second bus 50. Since the currents summed in this bus are applied directly to the input of amplifier 41 and thus undergo one less inversion that the currents supplied as the input to amplifier 40, the signals from this bus are of opposite polarity from those generated in bus 49. The resistors are connected to the appropriate bus to produce the correct polarity at the respective points in the wave forms. The relative values for each of the resistors $46_a$ through $46_t$ are shown in Table I. Since the output from amplifier 42 is to be provided as the driving signal for the cutting head on the record, the data rate binary clock 43 must also provide its output to amplifier 42 in order to record the synchronizing signal.

TABLE I

| Element | Resistance in ohms |
|---|---|
| 46*a* | 49.9 |
| 46*b* | 39.2 |
| 46*c* | 30.1 |
| 46*d* | 22.1 |
| 46*e* | 15.0 |
| 46*f* | 9.31 |
| 46*g* | 4.75 |
| 46*h* | 1.30 |
| 46*i* | 1.00 |
| 46*j* | 2.15 |
| 46*k* | 2.15 |
| 46*l* | 1.00 |
| 46*m* | 1.30 |
| 46*n* | 4.75 |
| 46*o* | 9.31 |
| 46*p* | 15.0 |
| 46*q* | 22.1 |
| 46*r* | 30.1 |
| 46*s* | 39.2 |
| 46*t* | 49.9 |

In FIG. 7*b* the details of a shift register section and switching arrangement suitable for use in a system as illustrated in FIG. 7*a* are shown. The shift register is formed of a series of connected flip-flops, as illustrated at 60 and 70. Each of these flip-flops has a triggering input signal from a clock to triggering input *t* and also has a signal input, *w*. A one on the signal input, *w*, results, upon the application of a triggering pulse to input *t*, in the transfer of a one to the next connected flip-flop input, *w*, and also provides an actuating signal on its output terminal *y*. For stage 60, the output terminal *y* is connected through a resistor chain 61 and 62 to a positive voltage supply +V. The junction between resistors 61 and 62 is connected to the base of a switching transistor 63. The switching transistor 63 is connected between the positive voltage +V and ground through potentiometer 64. The arm of potentiometer 64 is connected through the associated resistor 65 to one of the buses 49 or 50. A one on the *w* input, results, as above mentioned, in generating as actuating signal on output *y* which renders the transistor 63 conductive providing a surge of current through resistor 65. The potentiometer 64 allows for adjustment of the precise amount of current passing through resistor 65 and permits one to alter the shape of the symbol. This predistortion serves to reduce the overall closure of the reproduced eye due to residual group delay and amplitude distortion presented by various elements in the recording-reproducing system. Note too that the switching transistors are PNP units operated in inverted mode (i.e. the emitter is really used as the collector and vice versa). This connection serves to reduce the saturation voltage drop of the switch at the expense of reducing the current gain of the transistor to less than unity.

A staircase approximation to a wave form introduces a complexity in terms of the signal spectrum produced. A staircase approximation will produce not only the spectrum of the basic wave form but also additional sets of side bands. The first pair of side bands come at the sampling frequency used to generate the staircase. For the symbol generator illustrated in FIG. 7*a*, the sampling frequency is twice the data rate $F_D$ or $2/T$. Thus the first pair of side bands would extend for a bandwidth $1/2T$ above and below this sampling rate. This situation is illustrated in FIG. 8 in which the basic spectrum of the wave form is shown as existing between the frequencies 0 and $1/2T$ and the first pair of side bands are shown as extending from the frequency $2/T$ down to $3/2T$ and up to $5/2T$. Since the clock signal for synchronizing at the decoder is recorded as a sinusoidal signal at frequency $1/T$, then a relatively simple filter, as indicated by the dotted line, can be used to separate out the side bands from the combination of the basic symbol information and simultaneously stop the third harmonic of the input square wave clock. This filter would be placed at the output of the symbol generator.

If the frequency of sampling to generate the staircase were decreased to a rate of $1/T$, then the first pair of side bands would occur at this frequency and, would of course extend down to the frequency $1/2T$. At this sampling rate then the side bands could not be easily filtered out from the spectrum information and the resultant amplitude and group delay distortion introduced would tend to decrease the horizontal and vertical eye openings.

In some instances the signal paths or the cutting head will distort the generated wave form. To compensate for this the initial wave form may be predistorted in such a way that the final recorded wave form is correct. One method of doing this is to change the potentiometer settings in the generator.

In a specific example of the practice of this method, a seven inch record driven at a playback speed of 45 rpm has a storage capacity of $16\times10^6$ bits with a probability of error of $2\times10^{-4}$ with an accuracy in a synchronizing pulse of $\pm1/18$th of a clock period at a data rate of 15.6 kilobits per second.

Figures 9, 10:
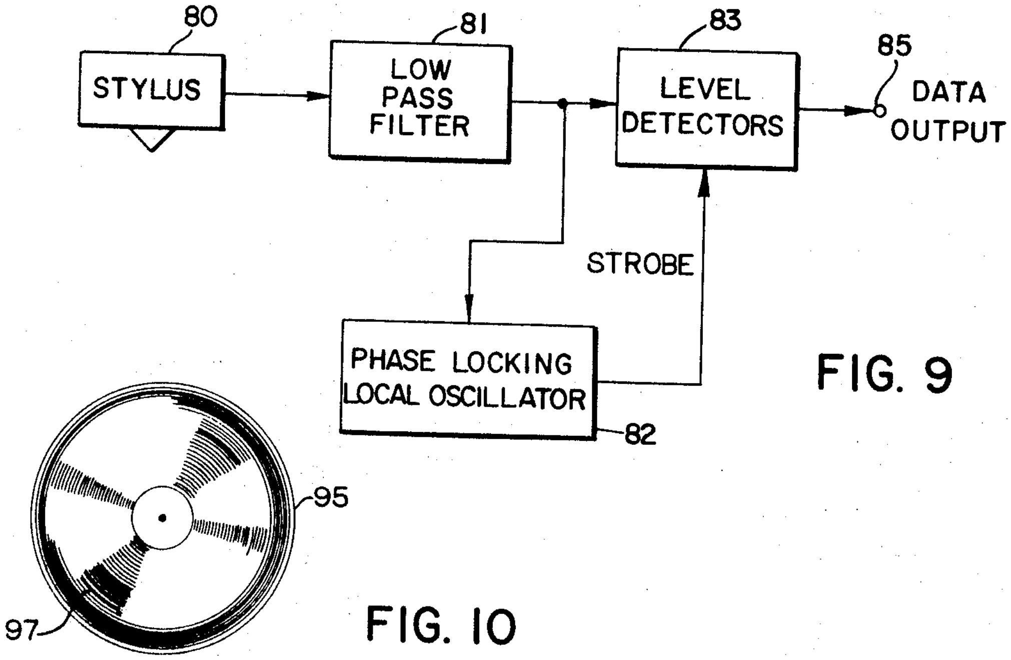
FIG. 9 is an illustration in block diagrammatic form of a readout apparatus useful in the practice of this invention.
FIG. 10 is a plan view of a recording medium disk useful in the practice of this invention.

The embodiments above described relate to a method and apparatus in which a clocking signal is recorded either in the same groove as the data signal or, in a stereo recording, as the signal for one of the stereo channels. As earlier mentioned, the clocking signal may be derived logically from the series of data signals. In FIG. 9 there is illustrated one readout arrangement for performing this function. The signal from the stylus 80 is connected through low pass filter 81 to a level detector 83 and also to a phase locking local oscillator 82. A strobe output signal from the oscillator 82 is applied to the level detector 83 and the output from the level detector 83 appears on the data output terminal 85. The low pass filter 81 simply filters out excessive high frequency noise and a relatively clean data signal is then applied to both the level detector 83 and the oscillator 82. The oscillator 82 oscillates at a frequency, which is closely tuned to the clocking frequency with which the data was recorded on the record. The phase locking circuit is such that only zero crossings occurring at data clock times are used to phase lock the strobe signals which activate the level detector 83. Thus, having locked in the phase of the local oscillator to the data signal zero crossings occurring at data clock times, the level detector is strobed at a precise time related to these zero crossings, so that the strobe pulse occurs at the center of the eye pattern. In order to insure that the phase locking does not occur on zero crossings, other than those occurring at data clock times, various logic circuits may be used.

It is apparent that in applications where the clock signal is derived from a local oscillator phase locked with the information from the data train itself, no clock signal need be superimposed on the data signal.

In FIG. 10, there is illustrated a data disk for use as a storage medium. The original recording disk 95, which typically would be formed of a conventional recording material such as cellulose acetate, has inscribed thereon a continuous spiral groove 97 forming the data track. Replicas of the above disk can be molded from such materials as polyvinyl acetate or styrene to provide means for distribution of the inscribed data to a multiplicity of reproducing stations. While the track 97 generally progresses along a spiral of specific pitch around the center of the disk, the data is stored as undulations in this groove in a plane normal to the direction of the spiral. The shape of these undulations results from the deflection of a cutting head by an electrical signal which is the superposition of the symbols earlier described and a sinusoidal signal at the clock rate, $F_D$. The velocity of the cutting head is maintained proportional to the amplitude of the driving signal. On playback of this disk rotating at constant rotational velocity the groove must be of such form that a reproducing stylus placed within it will move with a velocity variation in time precisely the same as that of the cutting head. Since the waveform of the groove in the disk must impart to the stylus a velocity proportional to the electrical signal waveform, the waveform of groove wall displacement is not itself the same as the electrical waveform of the driving signal, but is, rather, proportional to approximately the integral of the driving signal.

Having described the invention, various modifications and improvements will now occur to those skilled in the art, and the invention should be construed as limited only by the spirit and scope of the appended claims.

What is claimed is:

1. Means for storing digital data at a given digital data rate with a bandwidth of one-half that data rate on a grooved record medium, wherein said data is represented by a series of digital signals of the form $a_1, a_2, \ldots a_n$, comprising:

means for converting said series of digital signals into a series of control signals of the form $b_1, b_2, \ldots b_n$, wherein $b_n = [a_n + b_{n-2}] \bmod 2$; and a symbol generator coupled to said means for generating control signals, said symbol generator comprising:

a shift register having a data input, a plurality of sequential storage positions, and clocking means for sequentially shifting an actuating signal at said data input through each of said storage positions;

a series of individual current generating means, each connected to one of said storage positions, each of said current generating means producing a specific current signal whenever said actuating signal is at the associated storage position;

a summing terminal for summing all of the currents produced by said current generators at any one time, said specific current signals being selected to produce in response to each actuating signal at said data input, a current wave form at said summing terminal of the form $$S(t) = 1/2\left[\frac{\sin \pi(T+t)}{\pi(T+t)} - \frac{\sin \pi(T-t)}{\pi(T-t)}\right]$$

where $t$ = the instantaneous time, and

T = the interval between bits of data of said original series of digital data signals;

wherein said clocking means shifting signal is at a rate at least equal to $2/T$;

a record medium;

a record cutter head operatively positioned with respect to said record medium; and means for driving said record cutter head to inscribe said wave forms produced at said summing terminal as an undulating groove on said recording medium.

2. Apparatus in accordance with claim 1 in which the conversion means comprises a plurality of gates and bistable elements.

3. A means in accordance with claim 1 wherein said clocking means shifting signal is at a rate equal to $2/T$ and wherein said symbol generator further includes a filter coupled to said summing terminal, said filter being arranged to attenuate all signals at a frequency greater than $3T/2$.

4. Means for storing digital data at a given digital data rate, $1/T$, with a bandwidth of one-half that data rate on a grooved record medium, wherein said data is represented by a series of digital signals of the form $a_1, a_2, \ldots a_n$, comprising:

means for converting said series of digital signals into a series of control signals of the form $b_1, b_2, \ldots b_n$, wherein $b_n = [a_n + b_{n-2}] \bmod 2$; and a symbol generator coupled to said means for generating control signals, said symbol generator comprising:

a shift register having a data input, a plurality of sequential storage positions, and clocking means for sequentially shifting an actuating signal at said data input through each of said storage positions;

a series of individual current generating means, each connected to one of said storage positions, each of said current generating means producing a specific current signal whenever said actuating signal is at the associated storage position;

a summing terminal for summing all of the currents produced by said current generators at any one time, said specific current signals being selected to produce in response to each actuating signal at said data input, a current wave form at said summing terminal having a form in the time domain such that it has zero amplitude crossings at intervals $2T$, and such that the superposition of a series of these symbols produces at each interval, $T$, a signal amplitude which may be characterized as either a positive unit value or a negative unit value, and a frequency characteristic such that the frequency extends from zero to $½T$ with a generally symmetric shape and a roll off characteristic from mid-band of substantially 6 db/octave;

a record medium;

a record cutter head operatively positioned with respect to said record medium; and means for driving said record cutter head to inscribe said wave forms produced at said summing terminal as an undulating groove on said recording medium.

5. Apparatus in accordance with claim 4 wherein said current generators are connected to a common voltage source and each current generator includes an electronic switch and current limiting resistor.

* * * * *

FO-1050 (5/69)

UNITED STATES PATENT OFFICE

CERTIFICATE OF CORRECTION

Patent No. 3,740,733 Dated June 19, 1973

Inventor(s) Allan Chertok

It is certified that error appears in the above-identified patent and that said Letters Patent are hereby corrected as shown below:

In the Specification:

Column 7, line 44, change "$b_{22}$" to - $b_2$ -

Column 8, line 5, (equation) change "$b_{2-2}$" to - $b_{n-2}$ -

Column 8, line 25, cancel "and the bus 50 is connected together with the output from the amplifier 40"

Column 8, line 35, insert "input" before - terminal -

Signed and sealed this 18th day of December 1973.

(SEAL)
Attest:

EDWARD M. FLETCHER, JR.
Attesting Officer

RENE D. TEGTMEYER
Acting Commissioner of Patents